United States Patent [19]
Laudon et al.

[11] Patent Number: 5,727,150
[45] Date of Patent: Mar. 10, 1998

[54] APPARATUS AND METHOD FOR PAGE MIGRATION IN A NON-UNIFORM MEMORY ACCESS (NUMA) SYSTEM

[75] Inventors: James P. Laudon, Menlo Park; Daniel E. Lenoski, San Jose, both of Calif.

[73] Assignee: Silicon Graphics, Inc., Mountain View, Calif.

[21] Appl. No.: 766,363

[22] Filed: Dec. 17, 1996

Related U.S. Application Data

[63] Continuation of Ser. No. 435,464, May 5, 1995, abandoned.

[51] Int. Cl.$^6$ ........................................................ G06F 13/00
[52] U.S. Cl. ........................... 395/200.08; 395/200.01; 395/200.03; 395/200.09; 395/474
[58] Field of Search ............................ 395/474, 475, 395/476, 477, 478, 480, 497.04, 421.09, 460, 457, 458, 200.03, 200.01, 200.02, 200.09, 200.11, 289, 200.08, 492, 446, 447, 448, 449, 650, 600

[56] References Cited

U.S. PATENT DOCUMENTS

| | | | |
|---|---|---|---|
| 5,269,013 | 12/1993 | Abramson et al. | 395/650 |
| 5,313,631 | 5/1994 | Kao | 395/620 |

OTHER PUBLICATIONS

Intellectual leverage, San Francisco, Feb. 26–Mar. 3, 1989, IEEE, pp. 184–190. "Competitive Management of Distributed Shared Memory", Black D. L. et al.

Proceedings of the Symposium on Operating Systems Principles, Pacific Grove, Oct. 13–16, 1991, No. Symp. 13, 13 Oct. 1991, Association for Computing Machinery, pp. 137–151, XP000313825, Larowe, Jr. Richard P. et al.: The Robustness of NUMA Memory Managment.

Intellectual Leverage, San Francisco, Feb. 27–Mar. 3, 1989 no. Conf. 34, 27 Feb. 1989, Institute of Electrical and Electronics Engineers, pp. 184–190, XP000092718, Black D. L. et al.: Competitive Management of Distributed Shared Memory.

Computer Architecture News, vol. 17, No. 2, 1 Apr. 1989, pp. 104–112, XP000065592, Holliday M. A.: Reference History, Page Size, and Migration Daemonns in Local/Remote Architectures.

A. Agarwal, R. Simoni, J. Hennessey and M. Horowitz, "An Evaluation of Directory Schemes for Cache Coherence", *Proceedings of the 15th Int. Symp. on Computer Architecture*, Jun. 1988, pp. 280–289.

H. Burkhart III et al., "The KSR1: Bridging the Gap Between Shared Memory and MPP's", Kendall Square Research Corporation, 1993, pp. 285–294.

L. Censier and P. Fearrier, "A New Solution to Coherence Problems in Multi–Cache Systems", *IEEE Transactions on Computers*, vol. 27, No. 12, Dec. 1978, pp. 1112–1118.

A. Grupta, W. Weber and T. Mowry, "Reducing Memory and Traffic Requirements for Scalable Directory–Based Cache Conference Schemes", *Proceedings of the 1990 Conference on Parallel Processing*, Aug. 1990, pp. 312–321.

*Primary Examiner*—Jack B. Harvey
*Assistant Examiner*—Ario Etienne
*Attorney, Agent, or Firm*—Sterne, Kessler, Goldstein & Fox,P.L.L.C.

[57] ABSTRACT

A page migration controller is described. The page migration controller determines whether a memory page addressed by a memory access request should be migrated from a local processing node to a requester processing node. The page migration controller accesses an array to obtain a first count associated with the addressed memory page and the requester processing node, and a second count associated with the addressed memory page and the local processing node. The first count is incremented, and then the second count is subtracted from the incremented first count to obtain a difference between the second count and the incremented first count. A comparator determines whether the difference is greater than a migration threshold value. If the difference is greater than the migration threshold value, then a migration interrupt is issued.

28 Claims, 4 Drawing Sheets

APPARATUS AND METHOD FOR PAGE MIGRATION IN A NON-UNIFORM MEMORY ACCESS (NUMA) SYSTEM

This application is a continuation of application Ser. No. 08/435,464, filed May 5, 1995, now abandoned.

BACKGROUND OF THE INVENTION

1. Field of the Invention

The present invention relates generally to allocation of data in a computer system with distributed memory, and more particularly to migration of memory pages in a distributed, non-uniform memory access (NUMA) computer system.

2. Related Art

A distributed memory computer system typically includes a plurality of physically distinct and separated processing nodes each having one or more processors, and main memory that can be accessed by any of the processors. The main memory is physically distributed among the processing nodes. In other words, each processing node includes a portion of the main memory. Thus, each processor sees "local" main memory (i.e., the portion of main memory that resides in the same processing node as the processor) and "remote" main memory (i.e., the portion of main memory that resides in other processing nodes).

For each processor, the latency associated with accessing local main memory is significantly less than the latency associated with accessing remote main memory. Accordingly, distributed memory computer systems as just described are said to represent non-uniform memory access (NUMA) computer systems.

In NUMA computer systems, it is desirable to store data in the portion of main memory that exists in the same processing node as the processor that most frequently accesses the data (or as close as possible to the processor that most frequently accesses the dam). In other words, it is desirable to migrate data to the processing node containing the processor that most frequently accesses the data. By doing this, memory access latency is reduced, thereby improving overall system performance.

This goal is easy to achieve for private data that is being used by only one process. In this case, the operating system migrates the data to the portion of main memory that is in the same processing node as the processor where the process is to be run. However, for shared data that is accessed by many processes (each process potentially executing in a different processing node), the operating system generally has no idea which process will access the shared data most often. Even for private data, if a process is migrated (i.e., transferred from one processing node to another), it may make more sense to move only the most frequently used dam to the new node in anticipation that the process may eventually be migrated back to the original node.

A cache-only memory architecture (COMA) represents one known hardware scheme for migrating data in NUMA computer systems so as to reduce memory access latency. COMA operates to migrate data close to the processor that is accessing it. In COMA, main memory is treated as cache memory. COMA utilizes a modified cache coherency protocol to achieve this functionality. Unlike traditional cache coherency protocols, the COMA cache coherency protocol must deal with issues of memory block replacement and enforcement of multi-level cache inclusion. Thus, COMA is not a preferred solution since it increases the complexity of the cache coherency protocol.

In COMA, the processing of a cache miss involves sequential access to local main memory and to a remote memory (that is dirty) in order to access any memory location not found in the local main memory. COMA requires a relatively large memory bandwidth to perform these memory look-ups, as well as to perform the final allocation of local memory when the cache miss is satisfied. Accordingly, the COMA architecture is generally lower performance than other architectures, and incurs higher memory latency than other architectures.

COMA associates a cache tag with every block of memory (typically between 32 to 128 bytes of memory). These cache tags are frequently maintained in expensive static random access memory (SRAM) (as opposed to less expensive dynamic RAM). Thus, the memory overhead associated with COMA is potentially great.

Software schemes to migrate data in NUMA computer systems so as to reduce memory access latency have also been proposed. In one scheme, software maintains a counter per memory page per processing node. Software does not update these counters for each cache miss, since the overhead associated with such software operation would severely degrade system performance. Instead, software increments a node's counter upon each TLB (translation look-aside buffer) miss. Typically, the counters are updated by the TLB exception handler.

While this known software approach reduces the performance impact (when compared to updating the counters for each cache miss), it still adds software instructions to a very performance critical portion of the operating system. Furthermore, the number of TLB misses does not necessarily correlate with the number of cache misses that a given page experiences. Thus, basing page migration on TLB misses can result in significantly delaying the migration of pages to the appropriate nodes, or in incorrectly migrating pages from one node to another.

Accordingly, what is required is an improved system and method for migrating data in NUMA computer systems so as to reduce memory access latency.

SUMMARY OF THE INVENTION

The present invention is directed to an apparatus in a local processing node that includes a local portion of main memory. The local processing node is in a computer system comprising one or more additional processing nodes, where each additional processing node includes a remote portion of main memory. The apparatus controls migration of memory pages in the computer system.

The apparatus includes an array which stores, for each memory page in the local portion of main memory, a count for each region of the computer system. Each region encompasses one or more processing nodes of the computer system. The apparatus also includes a page migration controller to determine whether a memory page addressed by a memory request should be migrated from the local portion of main memory to a requester processing node, where the memory request originates from the requester processing node.

The page migration controller accesses the array to obtain a first count associated with the addressed memory page and the requester processing node, and a second count associated with the addressed memory page and the local processing node. The first count is incremented, and then the second count is subtracted from the incremented first count to obtain a difference between the second count and the incremented first count. A comparator determines whether the difference is greater than a migration threshold value. If the difference is greater than the migration threshold value, then a migration interrupt is issued. Software receives this migration interrupt and decides whether or not to migrate the memory page.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to an improved system and method for migrating data in NUMA (non-uniform memory access) computer systems so as to reduce memory access latency. The invention operates to migrate (i.e., transfer) a data item to, or close to, the processing node containing the processor(s) that access the data item most frequently.

Such data migration is achieved through a combination of hardware and software. According to the present invention, hardware in a processing node (called the local node for reference purposes) maintains for each page of local main memory (i.e., that portion of main memory that is contained in the local node) a count for each processing node of the NUMA computer system (in an alternate embodiment, counts are associated with groups of processing nodes, as described below). For each memory access request, hardware increments the count associated with the requester node (i.e., the processing node that contains the processor that issued the memory access request). In one embodiment, the purpose of the memory access request is to fill a cache miss. In this case, the requester node is the processing node that contains the processor that experienced the cache miss.

Hardware compares the requester node's count to the count associated with the local node. If the requester node's count is sufficiently higher than the local node's count, then a software process is alerted (through an interrupt or polling, for example). The software process may cause the particular memory page to be migrated to the requester node, or close to the requester node.

Figure 1:
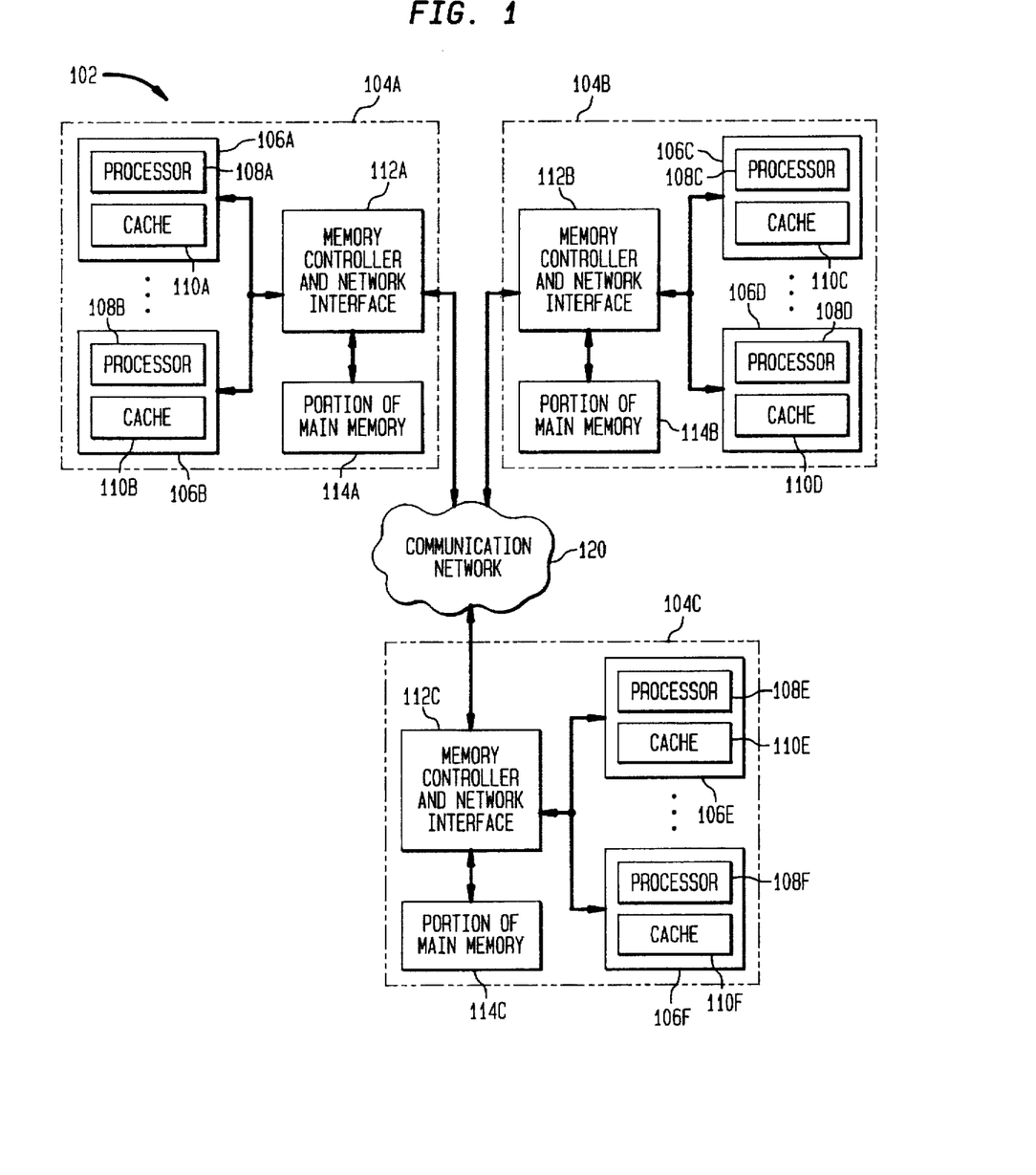
FIG. 1 is a block diagram of a non-uniform memory access (NUMA) computer system.

The present invention shall now be discussed in greater detail. FIG. 1 is a block diagram of a distributed memory computer system 102, preferably a distributed, non-uniform memory access (NUMA) computer system 102. The computer system 102 includes a plurality of processing nodes 104, which are physically distinct and physically separated from one another. The processing nodes 104 communicate with each other over a communication network 120, representing any well known data communication means, such as a bus, multistage interconnection network, local area network, wide area network, etc., or any combination of these.

Each processing node 104 includes one or more computing nodes 106 (preferably, each processing node 104 includes two computing nodes 106, although each processing node 104 may alternatively include other numbers of computing nodes 106). Each computing node 106 includes a processor 108 and a cache 110. Each processing node 104 also includes a memory controller and network interface 112. The processors 108 in any particular processing node 104 communicate with other devices connected to the communication network 120 via the memory controller and network interface 112 contained in that processing node 104.

Each processing node 104 also includes a portion of main memory 114. The portions of main memory 114 in all of the processing nodes 104 collectively represent the main memory of the computer system 104. Any processor 108 in any processing node 104 can access data stored in the portion of main memory 114 contained in any other processing node 104. Access to data contained in the portion of main memory 114 of any particular processing node 104 is controlled by the memory controller and network interface 112 contained in that same processing node 104.

Figure 2A:
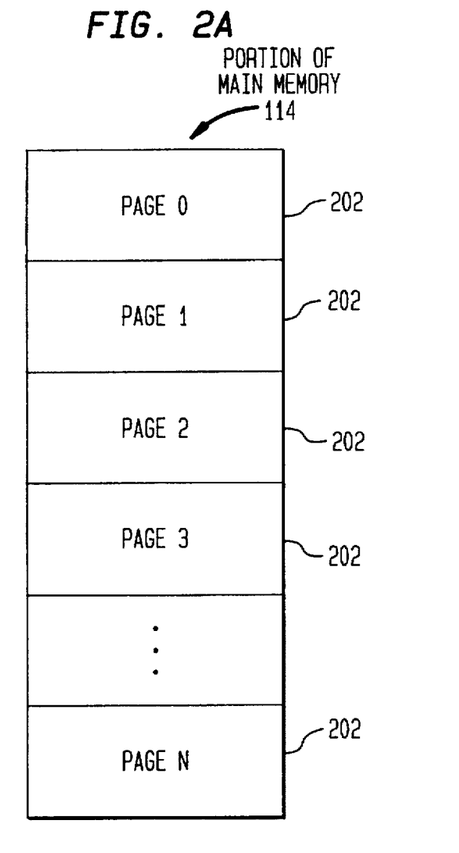
FIG. 2A is a block diagram of a portion of main memory.

FIG. 2A is a more detailed block diagram of a portion of main memory 114. Each portion of main memory 114 includes N memory pages 202 (individually labeled page 0, page 1, . . . , page N). Preferably, each memory page 202 is 4 kbytes in size, although the present invention operates equally well with other memory page sizes. The value of N is implementation dependent.

Figure 2B:
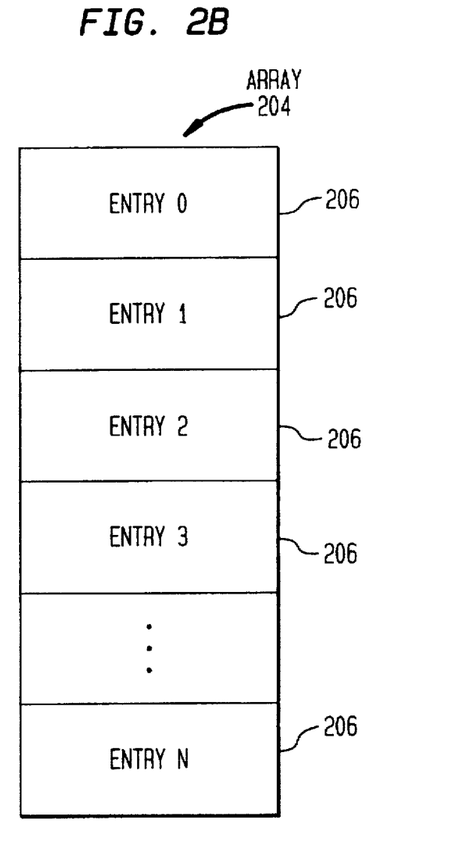
FIG. 2B is a block diagram of an array associated with the portion of main memory of FIG. 2A.

FIG. 2B is a block diagram of an array 204 maintained in each processing node 104 according to a preferred embodiment of the present invention. The array 204 includes an entry 206 for each memory page 202 in the portion of main memory 114. Thus, the array 204 includes N entries 206, individually labeled entry 0, entry 1, . . . , entry N. Entry 0 corresponds to memory page 0, entry 1 corresponds to memory page 1, etc. The array 204 is preferably stored in dynamic random access memory (DRAM). In one embodiment, the array 204 is stored in the portion of the cache coherency directory for main memory 114. According to the present invention, system performance is enhanced by simultaneously accessing and retrieving an addressed page 202 and an entry 206 in the array 204 associated with the addressed page 202.

Figure 3:
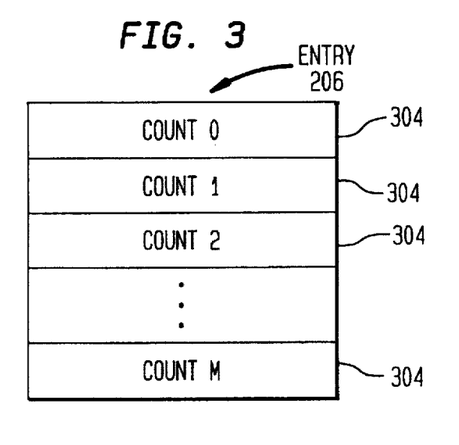
FIG. 3 is a block diagram of an entry of the array of FIG. 2B.

FIG. 3 is a block diagram of an entry 206 in an array 204. Each entry 206 stores M counts 304 (individually labeled count 0, count 1, . . . , count M), one for each region of the computer system 102. (Thus, the array 204 represents a bank of counts 304. It should be understood that any other storage mechanism could be used to store the counts 304, such as registers.) If the computer system 102 has M or less processing nodes 104, then a region preferably contains a single processing node 104, such that a count 304 corresponds to a single processing node 104. If, instead, the computer system 102 has P processing nodes 104, where P is greater than M, then each region contains multiple processing nodes 104. In this case, each region preferably contains Q processing nodes 104, where P/Q is less than or equal to M. (It should be understood that any group of processing nodes 104 can be established to represent a region.) Q is preferably equal to 8, although the present invention operates equally well with other values of Q.

As will be appreciated based on the above description, each count 304 is associated with a particular memory page 202 in a particular processing node 102, and also associated with a particular region of the computer system 102. The count 304 is a measure of the number of times processor(s) 108 in that region accessed this particular memory page 202 in this particular processing node 102. The count 304 is used by the present invention to determine whether this particular memory page 202 should be migrated to a processing node 104 in the region associated with the count 304.

Figure 4:
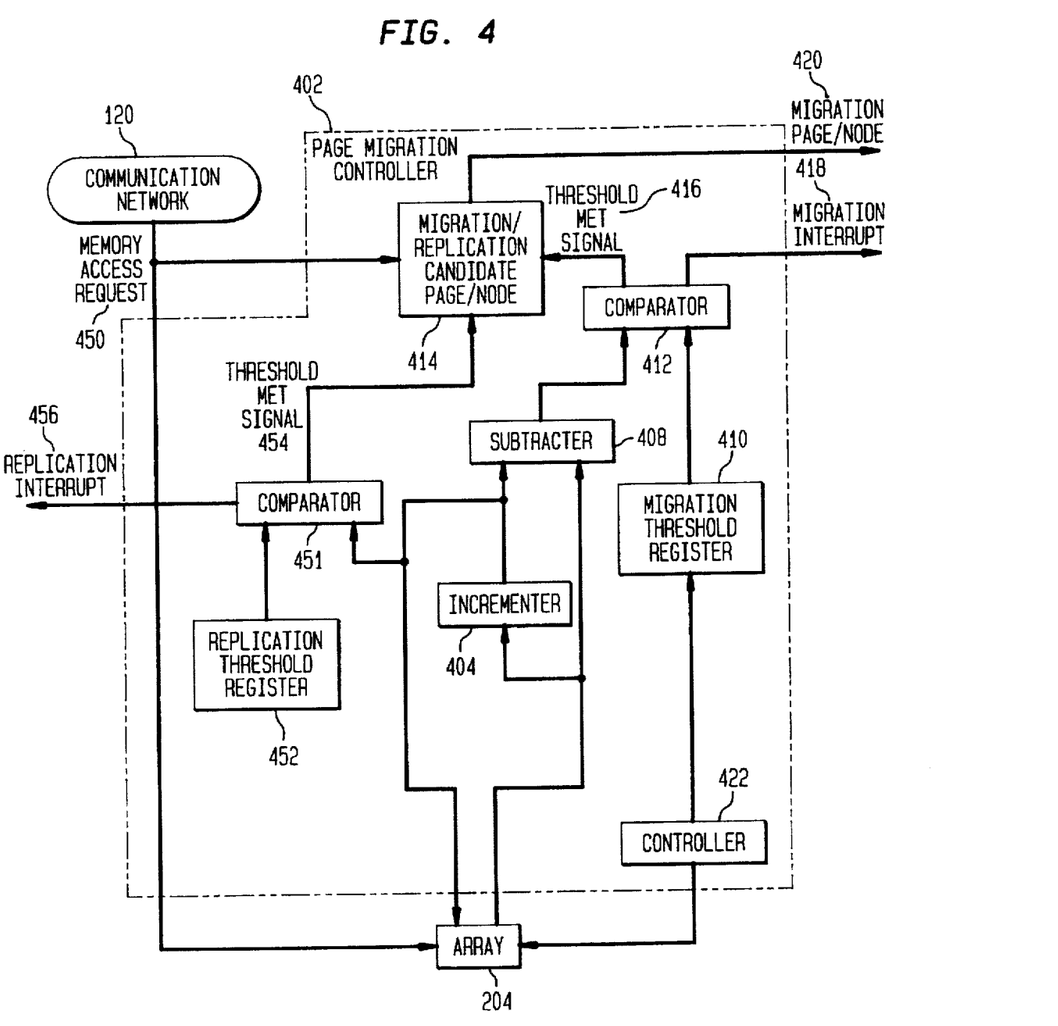
FIG. 4 is a functional block diagram of a page migration controller according to a preferred embodiment of the present invention.

FIG. 4 is a block diagram of a page migration controller 402. The page migration controller 402 is preferably a hardware device implemented as part of the memory controller and network interface 112 in a processing node 104. For illustrative purposes, the page migration controller 402 contained in the memory controller and network interface 112A in the processing node 104A is described below (although the following description applies to page migration controllers 402 contained in all nodes 104). This processing node 104A is called the local node 104A for reference purposes. The page migration controller 402 determines whether memory pages in the local node 104A should be migrated to other processing nodes 104B, 104C (called remote nodes 104B, 104C for reference purposes) in the computer system 102.

The components contained within the page migration controller 402 represent operations/functions performed by the page migration controller 402. Implementation of the page migration controller 402 such that the page migration controller 402 performs the operations/functions shown in FIGS. 4, and discussed herein, will be apparent to persons skilled in the relevant art(s).

Figure 5:
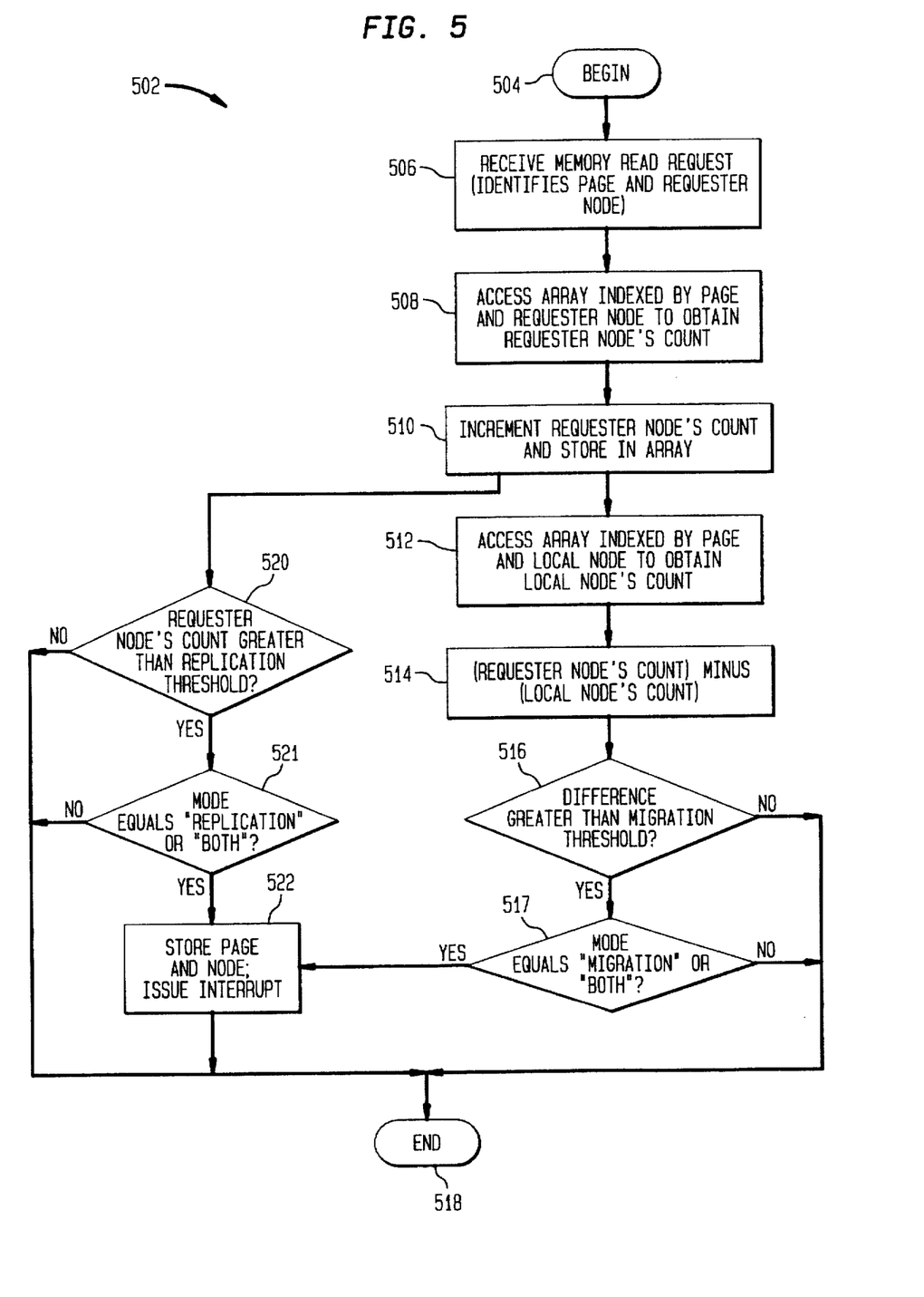
FIG. 5 is a flowchart depicting the operation of the page migration controller of FIG. 4.

The operation of the page migration controller 402 shall now be described with reference to FIG. 4, and also with reference to an operational flowchart 502 shown in FIG. 5. For ease of illustration, the following description assumes that each count 304 corresponds to a single processing node 104 (i.e., each region comprises one processing node 104). It should be understood, however, that the following description is equally applicable where each region comprises multiple processing nodes 104.

In step 506, the page migration controller 402 receives a memory access request 450 issued by a processor 108. The processing node 104 containing this processor 108 is called the requester node 104 for reference purposes. The memory access request 450 may have been issued by a processor 108 contained in the local node 104A, in which case the local node 104A would be the same as the requester node 104A. Alternatively, the memory access request 450 may have been issued by a processor 108 contained in a remote node 104B or 104C, in which case the local node 104A would not be the same as the requester node 104B or 104C. For illustrative purposes, assume that a processor 108E or 108F in processing node 104C issued the memory access request, such that processing node 104C is the requester node 104C.

The memory access request 450 contains information that identifies the memory page 202 being accessed. For illustrative purposes, assume that memory page 1 is being accessed. The memory access request 450 also contains information that identifies the requester node 104C. In step 508, the page migration counter 402 accesses the array 204 using this information contained in the memory access request 450 and retrieves the count 304 associated with memory page 1 and the requester node 104C (i.e., the memory page and the node identified by the memory access request 450).

In step 510, an incrementer 404 increments the requester node 104C's count 304 by one, and stores the new value of this count 304 in the array 204. In an alternate embodiment, a statistical increment is performed, wherein the probability of incrementing a requester node's count is less than one. Preferably, this probability is set by one of a number of pseudo-random mechanisms such as incrementing every request after N local clock cycles or after N requests or DRAM refresh cycles.

The sequence of steps beginning with step 512 and the sequence of steps beginning with step 520 are performed after step 510. In particular, the sequence of steps beginning with step 512 are performed at the same time as the sequence of steps beginning with step 520. The sequence of steps beginning with step 512 shall first be described.

In step 512, the page migration counter 402 accesses the array 204 and retrieves the count 304 associated with memory page 1 (i.e., the same memory page 202 identified by the memory access request 450) and the local node 104A.

In step 514, the local node 104A's count 304 and the requester node 104C's count 304 (as incremented by the incrementer 404) are provided to a subtracter 408. The subtracter 408 subtracts the local node 104A's count 304 from the requester node 104C's count 304, and provides this difference to a comparator 412. The subtracter 408 and the comparator 412 may represent an arithmetic logic unit (ALU), for example.

In step 516, the comparator 412 compares this difference to a migration threshold value stored in a migration threshold register 410 and determines whether the difference is greater than the migration threshold value. The purpose for this function shall now be described.

There is some system cost associated with migrating memory page 1 from the local node 104A to the requester node 104C. Accordingly, memory page 1 should only be migrated to the requester node 104C if the number of accesses to memory page 1 made by the requester node 104C is sufficiently greater than the number of accesses made by the local node 104A. The migration threshold value quantifies this migration system cost. If the difference is greater than the migration threshold value, then it may be necessary to migrate memory page 1. If, instead, the difference is less than or equal to the migration threshold value, then memory page 1 is not migrated to the requester node 104C.

The migration threshold value is implementation dependent and depends on the performance parameters of the computer system 102. Preferably, the migration threshold value stored in the migration threshold register 410 is the same for all regions of the computer system 102. In an alternate embodiment, the migration threshold register 410 stores a migration threshold value for each region of the computer system 102. In this alternate embodiment, migration threshold values are specialized for each region according to a number of factors, such as the distance of the region from the local node 104A, the communication cost associated with migrating a page from the local node 104A to the region, load on the system, the migration history of the memory page, etc.

The migration threshold value is software adjustable, but is preferably not adjusted dynamically. In an alternate embodiment, the migration threshold value for each region is adjusted dynamically. This is also the case in the embodiment where there is a single migration threshold value for all regions. Such dynamic adjustment depends on a number of factors, such as load on the system, the number and types of applications that are running, user characteristics, etc.

If it is determined in step 516 that the difference is not greater than the migration threshold value, then the sequence of steps beginning with step 512 is complete, as indicated by step 518. Otherwise, step 517 is performed.

Before discussing step 517, it will be useful to discuss an additional feature of the array 204. Referring again to FIG. 3, recall that each entry 206 stores M counts 304 (individually labeled count 0, count 1, . . . . , count M). According to an embodiment of the invention, each entry 206 also stores mode information that identifies a mode on a per memory page/per processing node (or per region) basis. The mode information is preferably set by the operating system, but also may be user adjustable. The present invention preferably supports four modes: "migration," "replication," "both migration and replication," or "don't care." The meaning of these four modes will become clear from the following discussion. Preferably, the mode information is implemented as two binary encoded bits.

Preferably, the present invention operates according to the mode specified by a page's entry 206 (alternatively, the present invention could operate based on a mode set for the entire local node 104A, or a mode determined by the requestor node 104C's mode). Accordingly, in step 512 (discussed above), in addition to retrieving the count 304 associated with memory page 1 and the local node 104A, the page migration counter 402 also accesses the array 204 and retrieves the mode information associated with memory page 1 (i.e., the requested memory page) and the local node 104A.

Referring again to FIG. 5, in step 517 the page migration controller 402 determines whether the mode for memory page 1 and the local node 104A is equal to "migration" or "both migration and replication." If the mode for memory page 1 and the local node 104A is equal to "migration" or "both migration and replication," then step 522 is performed. Otherwise, the sequence of steps beginning with step 512 is complete, as indicated by step 518.

In step 522, the page migration controller 402 stores information contained in the memory access request 450 in a migration/replication candidate page/node register 414. Such information identifies the page that was accessed (i.e., page 1) and the node which accessed this page (i.e., requester node 104C). The page migration controller 402 then issues a migration interrupt 418 (or a migration signal, in the case where the software process, described below, polls for such signals). (In an alternate embodiment, the page migration controller 402 in step 522 causes memory page 1 to be migrated to the requester node 104C.)

A software process (not shown) receives the migration interrupt/signal 418, and also accesses the migration/replication candidate page/node register 414 to obtain the migration page/node 420 (i.e., information identifying memory page 1 and requester node 104C). The software process is preferably part of the operating system. The software process decides whether or not to migrate page 1 to the requester node 104C. The software process considers a number of factors in this determination, such as system load, the migration history of the memory page, node bandwidth imbalance, etc. As a result of this determination, the software process may cause memory page 1 to be migrated to the requester node 104C.

The series of steps beginning with step 520 shall now be described.

In step 520, a comparator 451 compares the requester node 104C's count 304 to a replication threshold value stored in a replication threshold register 452. (In an alternate embodiment, a count associated with the region in which the requester node 104C is contained is compared to the replication threshold value.) If the requester node 104C's count 304 is greater than the replication threshold value, then it may be necessary to replicate memory page 1 to the requester node 104C. Accordingly, step 521 is performed, described below. If, instead, the requester node 104C's count is less than or equal to the replication threshold value, then memory page 1 is not replicated to the requester node 104C and processing is complete, as indicated by step 518.

In step 521, the page migration controller 402 determines whether the mode for memory page 1 and the local node 104A is equal to "replication" or "both migration and replication." If the mode for memory page 1 and the local node 104A is equal to "replication" or "both migration and replication," then step 522 is performed. Otherwise, the sequence of steps beginning with step 520 is complete, as indicated by step 518.

In step 522, the page migration controller 402 stores information contained in the memory access request 450 in the migration/replication candidate page/node register 414. Such information identifies the page that was accessed (i.e., page 1) and the node which accessed this page (i.e., requester node 104C). The page migration controller 402 then issues a replication interrupt 456 (or a replication signal, in the case where the software process, described below, polls for such signals). (In an alternate embodiment, the page migration controller 402 in step 522 causes memory page 1 to be replicated to the requester node 104C.)

A software process (not shown), which may be the same software process as discussed above, receives the replication interrupt/signal 456, and also accesses the migration/replication candidate page/node register 414 to obtain the replication page/node 420 (i.e., information identifying memory page 1 and requester node 104C). The software process is preferably part of the operating system. The software process decides whether or not to replicate page 1 to the requester node 104C. The software process considers a number of factors in this determination, such as system load, the migration history of the memory page, node bandwidth imbalance, etc. As a result of this determination, the software process may cause memory page 1 to be replicated to the requester node 104C.

The replication threshold value stored in the replication threshold register 452 is a measure of the number of times a node must access a memory page before it is advantageous to replicate the memory page to the node. The considerations regarding the migration threshold (discussed above) also generally apply to the replication threshold.

As discussed above, the software process receives the migration interrupt 418 (if the migration interrupt 418 is issued) and the replication interrupt 456 (if the replication interrupt 456 is issued). As also discussed above, the software process considers a number of factors when deciding whether to migrate or replicate a memory page to the requester node. An additional factor which is considered, that was not discussed above, is whether or not the software process received both the migration interrupt 418 and the replication interrupt 456.

As will be appreciated, if a memory page is migrated from a local node to a requester node, then the copy of the memory page in the local node is made invalid. In contrast, the copy of the memory page in the local node is still valid, even if the memory page is replicated to the requester node (this aspect of the invention is effective mainly with read only data, and can be used to identify pages that need to be replicated, i.e., have multiple copies created on multiple nodes). The present invention does not both migrate and replicate a memory page.

If the software process receives both the migration interrupt 418 and the replication interrupt 456, then the software process decides whether to migrate, or replicate, or to do neither. In one embodiment, the software process places a higher priority on migration than replication, such that if both the migration interrupt 418 and the replication interrupt 456 are received, then migration is performed (assuming that the software process does not decide to do neither). It should be understood, however, that the operation of the software process in this regard is implementation specific.

Note that if the mode is "don't care," then the page migration controller 402 does not issue the migration interrupt 418 or the replication interrupt 456.

The operation of the page migration controller 402 as discussed above, and in particular the interaction between components of the page migration controller 402 as discussed above, is achieved by operation of a controller 422. Preferably, the controller 422 is implemented as a hardware state machine, for example. Implementation of the controller 422 will be apparent to persons skilled in the relevant an(s).

Also, actual implementation of the page migration controller 402 will be apparent to persons skilled in the relevant art(s). For example, in practice, the page migration controller 402 may include a number of registers to temporarily store intermediate results. For example, a register may be positioned between the incrementer 404 and the subtracter 408 to temporarily save the results of the subtracter 408. Another register may be positioned between the array 204 and the incrementer 404 and subtracter 408, to temporarily save a count retrieved from the array 204. Other implementation details will be apparent to persons skilled in the relevant art(s).

Since the present invention is implemented in hardware, it does not suffer from the problems associated with the conventional software approach, described above. Specifically, since the present invention is implemented in hardware, it is possible in the present invention to update counts after each memory access without degrading system performance. Accordingly, the present invention efficiently and effectively migrates memory pages in a NUMA computer system.

Note that the present invention achieves efficient and effective page migration without increasing the complexity of the cache coherency protocol. Also, the present invention achieves page migration without requiring a large memory bandwidth for memory look-ups. Further, the present invention does not associate a cache tag with every block of memory. Note that the array of the present invention is stored in inexpensive DRAM, rather than expensive SRAM. Thus, the present invention does not suffer from the problems that plague the conventional hardware approach, described above.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus in a local processing node, said local processing node comprising a local portion of main memory, said local processing node being in a computer system comprising one or more additional processing nodes, each additional processing node including a remote portion of main memory, said apparatus controlling migration of memory pages in said computer system, said apparatus comprising:

a storage mechanism storing, for each memory page in said local portion of main memory, a count for each region of said computer system, each region encompassing one or more processing nodes of said computer system;

a page migration controller to determine whether a memory page addressed by a memory access request should be migrated from said local portion of main memory to a requester processing node, said memory access request originating from said requester processing node, said page migration controller comprising:

means for accessing said storage mechanism to obtain a first count associated with said addressed memory page and said requester processing node, and a second count associated with said addressed memory page and said local processing node;

an incrementer to increment said first count;

means for storing said incremented first count in said storage mechanism; and migration signal issuing means for issuing a migration signal if a difference between said second count and said incremented first count is greater than a migration threshold value.

2. The apparatus of claim 1, wherein said migration signal issuing means comprises:

a subtracter to subtract said second count from said incremented first count to obtain a difference between said second count and said incremented first count;

a comparator to determine whether said difference is greater than said migration threshold value; and a controller to issue said migration signal if said difference is greater than said migration threshold value.

3. The apparatus of claim 2, wherein said page migration controller further comprises:

a migration threshold register for storing a migration threshold value for each region of said computer system;

means for retrieving from said migration threshold register a migration threshold value associated with a region of said computer system containing said requester processing node; and means for providing said retrieved migration threshold value to said comparator.

4. The apparatus of claim 1, wherein said computer system includes means for migrating said addressed memory page from said local processing node to said requester processing node in response to receiving said migration signal.

5. The apparatus of claim 2, wherein said controller causes said addressed memory page to be migrated from said local processing node to said requester processing node if said difference is greater than said migration threshold value.

6. The apparatus of claim 1, wherein said first count indicates how many times said addressed memory page was accessed for the purpose of filling a cache miss by processors in a region comprising said requester processing node, and said second count indicates how many times said addressed memory page was accessed for the purpose of filling a cache miss by processors in a region comprising said local processing node.

7. A page migration controller in a local processing node, said local processing node comprising a local portion of main memory, said local processing node being in a computer system comprising one or more additional processing nodes, each additional processing node including a remote portion of main memory, said local processing node also comprising an storage mechanism storing, for each memory page in said local portion of main memory, a count for each region of said computer system, each region encompassing one or more processing nodes of said computer system, said page migration controller determining whether a memory page addressed by a memory access request should be migrated from said local portion of main memory to a requester processing node, said memory access request originating from said requester processing node, said page migration controller comprising:

means for accessing said storage mechanism to obtain a first count associated with said addressed memory page and said requester processing node, and a second count associated with said addressed memory page and said local processing node;

an incrementer to increment said first count;

means for storing said incremented first count in said storage mechanism; and     migration signal issuing means for issuing a migration signal if a difference between said second count and said incremented first count is greater than a migration threshold value.

8. The page migration controller of claim 7, wherein said migration signal issuing means comprises:

a subtracter to subtract said second count from said incremented first count to obtain a difference between said second count and said incremented first count;

a comparator to determine whether said difference is greater than said migration threshold value; and     a controller to issue said migration signal if said difference is greater than said migration threshold value.

9. The page migration controller of claim 8, wherein said page migration controller further comprises:

a migration threshold register for storing a migration threshold value for each region of said computer system;

means for retrieving from said migration threshold register a migration threshold value associated with a region of said computer system containing said requester processing node; and     means for providing said retrieved migration threshold value to said comparator.

10. The page migration controller of claim 7, wherein said computer system includes means for migrating said addressed memory page from said local processing node to said requester processing node in response to receiving said migration signal.

11. The page migration controller of claim 8, wherein said controller causes said addressed memory page to be migrated from said local processing node to said requester processing node if said difference is greater than said migration threshold value.

12. The page migration controller of claim 7, wherein said first count indicates how many times said addressed memory page was accessed for the purpose of filling a cache miss by processors in a region comprising said requester processing node, and said second count indicates how many times said addressed memory page was accessed for the purpose of filling a cache miss by processors in a region comprising said local processing node.

13. A memory computer system, comprising:

a plurality of processing nodes, each processing node comprising:

a local portion of main memory comprising a plurality of memory pages;

an storage mechanism storing, for each memory page in said local portion of main memory, a count for each region of said computer system, each region encompassing one or more of said processing nodes of said computer system; and         a page migration controller to determine whether a memory page addressed by a memory access request should be migrated from said local portion of main memory to a requester processing node, said memory access request originating from said requester processing node, said page migration controller comprising:

means for accessing said storage mechanism to obtain a first count associated with said addressed memory page and said requester processing node, and a second count associated with said addressed memory page and said each processing node;

an incrementer to increment said first count;

means for storing said incremented first count in said storage mechanism; and             migration signal issuing means for issuing a migration signal if a difference between said second count and said incremented first count is greater than a migration threshold value.

14. The memory computer system of claim 13, wherein said migration signal issuing means comprises:

a subtracter to subtract said second count from said incremented first count to obtain a difference between said second count and said incremented first count;

a comparator to determine whether said difference is greater than said migration threshold value; and     a controller to issue said migration signal if said difference is greater than said migration threshold value.

15. The memory computer system of claim 14, wherein said page migration controller further comprises:

a migration threshold register for storing a migration threshold value for each region of said computer system;

means for retrieving from said migration threshold register a migration threshold value associated with a region of said computer system containing said requester processing node; and     means for providing said retrieved migration threshold value to said comparator.

16. The memory computer system of claim 13, wherein said computer system also includes means for migrating said addressed memory page from said each processing node to said requester processing node in response to receiving said migration signal.

17. The memory computer system of claim 14, wherein said controller causes said addressed memory page to be migrated from said each processing node to said requester processing node if said difference is greater than said migration threshold value.

18. The memory computer system of claim 13, wherein said first count indicates how many times said addressed memory page was accessed for the purpose of filling a cache miss by processors in a region comprising said requester processing node, and said second count indicates how many times said addressed memory page was accessed for the purpose of filling a cache miss by processors in a region comprising said local processing node.

19. A page migration controller to determine whether a memory page addressed by a memory access request should be migrated from a local processing node in which said memory page is stored to a requester processing node in which said memory access request originated, comprising:
- means for obtaining a first count associated with said addressed memory page and said requester processing node, and a second count associated with said addressed memory page and said local processing node;
- an incrementer to increment said first count; and
- migration signal issuing means for issuing a migration signal if a difference between said second count and said incremented first count is greater than a migration threshold value.

20. The page migration controller of claim 19, wherein said migration signal issuing means comprises:
- a subtracter to subtract said second count from said incremented first count to obtain a difference between said second count and said incremented first count;
- a comparator to determine whether said difference is greater than said migration threshold value; and
- a controller to issue said migration signal if said difference is greater than said migration threshold value.

21. The page migration controller of claim 20, wherein said controller causes said addressed memory page to be migrated from said local processing node to said requester processing node if said difference is greater than said migration threshold value.

22. The page migration controller of claim 19, wherein said first count indicates how many times said addressed memory page was accessed for the purpose of filling a cache miss by processors in a region comprising said requester processing node, and said second count indicates how many times said addressed memory page was accessed for the purpose of filling a cache miss by processors in a region comprising said local processing node.

23. A method of determining whether a memory page addressed by a memory access request should be migrated from a local processing node in which said memory page is stored to a requester processing node in which said memory access request originated, comprising the steps of:
- obtaining a first count associated with said addressed memory page and said requester processing node, and a second count associated with said addressed memory page and said local processing node;
- incrementing said first count; and
- issuing a migration signal if a difference between said second count and said incremented first count is greater than a migration threshold value.

24. The method of claim 23, further comprising the step of:
- causing said addressed memory page to be migrated from said local processing node to said requester processing node in response to receiving said migration signal.

25. The method of claim 23, further comprising the step of:
- causing said addressed memory page to be migrated from said local processing node to said requester processing node if said difference is greater than said migration threshold value.

26. The method of claim 23, wherein said first count indicates how many times said addressed memory page was accessed for the purpose of filling a cache miss by processors in a region comprising said requester processing node, and said second count indicates how many times said addressed memory page was accessed for the purpose of filling a cache miss by processors in a region comprising said local processing node.

27. A method of determining whether a memory page, stored in a local processing node and addressed by a memory access request, should be replicated to a requester processing node in which said memory access request originated, comprising the steps of:
- obtaining a count from an array in said local processing node, said count being associated with said addressed memory page and said requester processing node;
- incrementing said count;
- obtaining a mode from said array, said mode being associated with said addressed memory page and said requester processing node:
- issuing a replication signal if said incremented count is greater than a replication threshold value and said mode indicates that a replication operation is desired for said addressed memory page and said requester processing node;
- receiving said replication signal; and
- determining, after receiving said replication signal, whether said memory page should be replicated based on at least one additional threshold factor, including at least one of system load, migration history of said addressed memory page, and node bandwidth imbalance.

28. The apparatus of claim 1, wherein said incrementer statistically increments first count.

* * * * *